United States Patent [19]
Moriyama

[11] Patent Number: 5,791,686
[45] Date of Patent: Aug. 11, 1998

[54] ENERGY ABSORBING INTERMEDIATE STEERING SHAFT

[75] Inventor: Seiichi Moriyama, Takasaki, Japan

[73] Assignee: NSK Ltd., Tokyo, Japan

[21] Appl. No.: 611,995

[22] Filed: Mar. 5, 1996

[30]     Foreign Application Priority Data

Mar. 24, 1995  [JP]  Japan ................... 7-065872

[51] Int. Cl.$^6$ ............................................. B62D 1/19
[52] U.S. Cl. ...................... 280/777; 74/492; 464/162
[58] Field of Search ............................ 280/777; 74/492; 464/162, 179; 188/371, 376

[56]        References Cited

U.S. PATENT DOCUMENTS 5,580,314  12/1996  Moriyama et al. ...................... 280/777

FOREIGN PATENT DOCUMENTS 0 683 084  11/1995  European Pat. Off. .
3-79472    4/1991   Japan .
6-72779    10/1994  Japan .
7-309241   11/1995  Japan .

*Primary Examiner*—Peter C. English
*Attorney, Agent, or Firm*—Shapiro and Shapiro

[57]            ABSTRACT

An energy absorbing type intermediate shaft structure to be incorporated into a steering device of an automobile for transmitting a steering force of a steering wheel to a steering gear, has a shaft inserted in a tube. The shaft has a small cross-sectional area portion and a pressing portion. A cover tube is present around the small cross-sectional area portion. The location at which the pressing portion is formed is regulated so that with the pressing portion bearing against the cover tube, one end edge of the cover tube may lie around the small cross-sectional area portion. A distance $\alpha$ between the pressing portion and the cover tube, a distance $\beta$ between the cover tube and the tube, and a distance $\gamma$ between the shaft and a member associated with a yoke in the steering device are set to satisfy the condition $\alpha+\beta<\gamma$.

2 Claims, 9 Drawing Sheets

ENERGY ABSORBING INTERMEDIATE STEERING SHAFT

BACKGROUND OF THE INVENTION

1. Field of the Invention

This invention relates to an energy absorbing type intermediate shaft structure incorporated in the steering apparatus of an automobile and utilized to transmit a steering force of a steering wheel to a steering gear.

2. Related Background Art

In a steering apparatus for an automobile, a mechanism as shown in FIG. 8 of the accompanying drawings is used to transmit a steering force of a steering wheel to a steering gear. In FIG. 8, the reference numeral 1 designates a steering shaft having a steering wheel 2 fixed to its upper end portion, and the reference numeral 3 denotes a steering column fixed to the underside of an instrument panel 6 by upper and lower brackets 4 and 5. The steering shaft 1 is rotatably inserted in the steering column 3.

The upper end portion of an intermediate shaft 8 is connected to the lower end portion of the steering shaft 1 which protrudes from the lower end opening of the steering column 3, through a first universal joint 7. Further, the lower end portion of this intermediate shaft 8 is connected to the input shaft 10 of a steering gear (not shown) through a second universal joint 9.

With such a construction, the movement of the steering wheel 2 is transmitted to the steering gear through the steering shaft 1, the first universal joint 7, the intermediate shaft 8, the second universal joint 9 and the input shaft 10, whereby a steering angle is given to wheels.

Now, in the thus constructed steering mechanism, in order to protect a driver during a collision, it has been generally practised to make the steering column 3, the steering shaft 1 and the intermediate shaft 8 into an energy absorbing type in which with a shock, their full length shrinks while they absorb the energy of the shock. As an energy absorbing type intermediate shaft, there is known one described, for example, in Japanese Patent Application Laid-Open No. 3-79472.

A first example of the energy absorbing type intermediate shaft 8 according to the prior art described in the above-mentioned publication, as shown in FIG. 9 of the accompanying drawings, is comprised of a combination of four members, i.e., a shaft 11, a connecting tube 15, a connecting shaft 18 and a tube 20. These members 11, 15, 18 and 20 are combined together with male spline grooves 13, 13 which are formed in one end portion (the right end portion as viewed in FIG. 9) of the shaft 11 and the opposite end portions of the connecting shaft 18 being engaged with female spline grooves 16, 16 which are formed in the opposite end portions of the connecting tube 15 and one end portion (the left end portion as viewed in FIG. 9) of the tube 20. In this state, the depth D from one end opening (the left end opening as viewed in FIG. 9) of the tube 20 to the end surface of a yoke 21 fixed to the other end portion (the right end portion as viewed in FIG. 9) of the tube 20 is equal to the length L of the connecting shaft 18 (D=L).

Further, synthetic resin 22a–22d is poured into concave grooves 14a–14d formed in the shaft 11 and the connecting shaft 18 through through-holes 17a–17d formed in the connecting tube 15 and the tube 20 and is solidified to thereby couple the members 11, 15, 18 and 20 together. As a result, these members 11, 15, 18 and 20 are coupled together against displacement in the direction of rotation and displacement in the axial direction (the left to right direction as viewed in FIG. 9) thereof. In the state in which the members 11, 15, 18 and 20 are thus combined together, a gap 23 is formed between one end surface (the right end surface as viewed in FIG. 9) of the shaft 11 and one end surface (the left end surface as viewed in FIG. 9) of the connecting shaft 18, and a gap 24 is formed between the other end surface (the right end surface as viewed in FIG. 9) of the connecting shaft 18 and the end surface of the yoke 21. Also, the connecting shaft 18 is extended between the connecting tube 15 and the tube 20 and enables the transmission of a rotational force between these two tubes 15 and 20 and in addition, prevents the abutting portions of these two tubes 15 and 20 from being bent.

When an automobile having the intermediate shaft 8 constructed as described above incorporated in the steering apparatus thereof collides and the front of this automobile is crushed, the second universal joint 9 comprising the yoke 12 is pushed rearwardly (rightwardly as viewed in FIG. 9) and the synthetic resin 22a, 22b connecting the shaft 11 and the connecting tube 15 together is first torn by a compression force applied to the intermediate shaft 8, and the shaft 11 is displaced rearwardly by an amount corresponding to the gap 23 and thus, one end surface of the shaft 11 and one end surface of the connecting shaft 18 which are opposed to each other come into collision with each other.

When the shaft 11 is further pushed rearwardly from this state, the synthetic resin 22c, 22d provided between the connecting shaft 18 and the connecting tube 15 and between the connecting shaft 18 and the tube 20 is torn and the connecting shaft 18 is displaced rearwardly by an amount corresponding to the gap 24, and the other end surface (the right end surface as viewed in FIG. 9) of the connecting shaft 18 and the end surface of the yoke 21 come into collision with each other. In this state, one end edge of the tube 20 and one end surface of the connecting shaft 18 lie on the same plane. Accordingly, the coupling support force of the tube 20 and the connecting tube 15 by the connecting shaft 18 (the force preventing the tubes 20 and 15 from bending) is lost.

As a result, the shaft 11 and the connecting shaft 18 separate from each other in such a manner as to bend, and the shaft 11 no longer pushes the connecting shaft 18 and the tube 20 rearwardly. Accordingly, even if, during the collision, the second universal joint 9 is pushed rearwardly, it will no longer happen that the first universal joint 7 is pushed rearwardly, whereby the steering wheel 2 will be prevented from jutting out toward the driver side to thereby prevent impartation of any danger to the driver.

Now, in the case of such an energy absorbing type intermediate shaft heretofore known, with the four members 11, 15, 18 and 20 which are constructed independently of one another being combined together in predetermined positional relationship, they are coupled together against displacement by the synthetic resin 22a–22d. Therefore, the assembling work has been cumbersome and the cost of manufacture has unavoidably increased. Also, because the shaft 11 and the connecting shaft 18 are divided into two, three or more backlash preventing means become necessary between the shafts 11, 18 and the tubes 15, 20. Therefore, the fit length between the shafts 11, 18 and the tubes 15, 20 becomes necessary to a certain degree, and this gives rise to problems such as the increased full length of the intermediate shaft 8, the cumbersomeness of the incorporating work and the difficulty in securing the crush allowance of the intermediate shaft 8.

In order to solve such problems, Japanese Utility Model Application Laid-Open No. 6-72779 describes an energy absorbing type intermediate shaft in which the number of parts is reduced to thereby simplify the assembling work and achieve a reduction in cost of manufacture. The second example of the energy absorbing type intermediate shaft according to the prior art described in this publication, as shown in FIG. 10 of the accompanying drawings, is provided with a tube 25, a shaft 26 and a displacement limiting portion 33. The shaft 26 is made not rotatable relative to the tube 25 by male spline grooves 29 formed in the outer peripheral surface of that portion of the shaft 26 which is near one end (the right upper end as viewed in FIG. 10) thereof being engaged with female spline grooves 28 formed in the inner peripheral surface of that portion of the tube 25 which is near one end (the left lower end as viewed in FIG. 10) thereof. The displacement limiting portion 33 enables the relative axial displacement of the shaft 26 and the tube 25 only when an axial strong force is applied to the intermediate shaft 8a, and is constructed as follows.

A concave groove 30 formed in the outer peripheral surface of one end portion (the right upper end portion as viewed in FIG. 10) of the shaft 26 is filled with synthetic resin 32 through through-holes 31, 31 formed in the outer peripheral surface of the intermediate portion load the tube 25. In the case of the illustrated example, the synthetic resin 32, after filling the concave groove 30, is torn between the through-holes 31, 31 and the concave groove 30. The limitation of the displacement of the two members 25 and 26 is provided by a frictional force acting between these members 25 and 26. This is for mitigating and stabilizing the load required for the shaft 26 and the tube 25 to begin to displace in case of a collision accident.

Further, a stopper portion is provided on the other end portion (the right upper end portion as viewed in FIG. 10) of the tube 25. This stopper portion serves to limit the amount of insertion of the shaft 26 into the tube 25 and in the case of the illustrated example, a pin 34 inserted in circular holes 38 and 37 formed in a yoke 36 and a shock absorbing tube 35, respectively, constituting a first universal joint 7 provides this stopper portion. Also, the intermediate portion of the shaft 26 is provided with a small cross-sectional area portion 39 concentric with the shaft 26 and sufficiently small in diameter as compared with the other portions of the shaft 26. The circumference of the portion on which this small cross-sectional area portion 39 is formed is covered with a cover tube 27. This cover tube 27 is supported around the shaft 26 for axial displacement only. That is, female spline grooves 40 are formed in the inner peripheral surface of the cover tube 27 and are spline-engaged with the male spline grooves 29 formed in the outer periphery of the shaft 26. The portion between the cover tube 27 and the small cross-sectional area portion 39 is filled with synthetic resin 42 through through-holes 41, 41. Further, the depth D' from one end edge of the tube 25 to the side of the pin 34 is made equal to the length L' from one end surface of the shaft 26 to the center of the small cross-sectional area portion 39. Accordingly, in a state in which one end surface of the shaft 26 strikes against the side of the pin 34, one end edge of the tube 25 lies around the intermediate portion of the small cross-sectional area portion 39.

The action when the second example of the energy absorbing type intermediate shaft according to the prior art constructed as described above transmits the movement of the steering wheel 2 (FIG. 8) to the steering gear is substantially similar to that in the case of the aforedescribed first example of the intermediate shaft according to the prior art. Also, in the case of the present structure, the cover tube 27 is present around the portion on which the small cross-sectional area portion 39 is formed and therefore, it does not happen that the shaft 26 bends at this small cross-sectional area portion 39. During a collision, the front of an automobile is crushed and the second universal joint 9 is pushed rearwardly (rightwardly as viewed in FIG. 10), whereby an axial strong compressive force is applied to the intermediate shaft 8a, the shaft 26 is pushed into the tube 25 against a frictional force present in the displacement limiting portion 33. Then, one end edge of the tube 25 and one end edge (the right upper end edge as viewed in FIG. 10) of the cover tube 27 abut with each other. Further, the synthetic resin 42 present around the small cross-sectional area portion 39 is torn and the shaft 26 is pushed farther into the tube 25 until one end surface of this shaft 26 strikes against the side of the pin 34. In this process, one end edge of the tube 25 pushes and moves the cover tube 27 from around the small cross-sectional area portion 39 and thus, one end edge of the tube 25 comes to lie around the small cross-sectional area portion 39.

When in this state, the above-mentioned compressive force is further applied, the shaft 26 bends at the small cross-sectional area portion 39, as shown in FIG. 11 of the accompanying drawings, and by the second universal joint 9, an impact force applied from the fore end side (the left end side as viewed in FIG. 10) of the intermediate shaft 8a is prevented from being transmitted to the first universal joint 7 provided on the rear end side (the right end side as viewed in FIG. 10) of the intermediate shaft 8a. The synthetic resin 42 filling the portion around the small cross-sectional area portion 39 is smashed and falls when the shaft 26 bends.

The above-mentioned Japanese Utility Model Application Laid-Open No. 6-72779 also describes structure in which, as shown in FIGS. 12 and 13 of the accompanying drawings, one end edge (the right upper end edge as viewed in FIGS. 12 and 13) of a cover tube 27a is inclined. In the case of such structure, in a state in which one end surface of a shaft 26 is pushed in until it strikes against a pin 34, the cover tube 27a retracts from around a small cross-sectional area portion 39 (FIG. 12) and further, by a compressive force being applied to the shaft 26, this shaft 26 is bent by a relatively light force (FIG. 13). That is, in a state in which the cover tube 27a retracts from around the small cross-sectional area portion 39 and as shown in FIG. 12, the small cross-sectional area portion 39 lies inside the abutting portion between the cover tube 27a and a tube 25, a receiving portion 46 formed on the shaft 26 bears against the other end edge of the cover tube 27a. At this time, one end surface of the shaft 26 bears against a pin 34, as shown in FIG. 11. In this state, the movement of the cover tube 27a is blocked. Therefore, when a compressive force is further applied to the shaft 26, the cover tube 27a is pushed between the receiving portion 46 and the tube 25 pushed by the pin 34 (see FIGS. 10 and 11). As a result, the shaft 26 bends at the small cross-sectional area portion 39 with one end surface thereof bearing against the pin 34. In the case of the second and third examples of the energy absorbing type intermediate shaft according to the prior art as described above, as compared with the structure of the aforedescribed first example of the prior art, sufficient energy absorbing capability is secured, and yet the number of parts can be reduced to thereby achieve simplification of the assembling work and thus, a reduction in cost of manufacture.

Further, the present applicant previously invented an energy absorbing type intermediate shaft keeping the effects of the structure of the aforedescribed second example of the prior art and capable of further reducing the cost of manufacture (Japanese Patent Application No. 6-106672). The energy absorbing type intermediate shaft 8b of this previous invention regulates the dimension of a small cross-sectional area portion 39a as shown in FIG. 14 of the accompanying drawings to thereby eliminate the necessity of strictly regulating the working accuracy of the male and female spline grooves 29 and 40 and achieve a reduction in the cost of manufacture.

That is, the outer diameter $r_{39a}$ of the small cross-sectional area portion 39a is ¼ to ½ of the outer diameter $R_{26}$ of the shaft 26 ($r_{39a}$=(¼ to ½) $R_{26}$). The outer diameter $r_{39a}$ of the small cross-sectional area portion 39a is the outer diameter of the intermediate portion of this small cross-sectional area portion 39a forming a pillar-like shape. Also, the length $l_{39a}$ of this small cross-sectional area portion 39a is two or more times as great as the outer diameter $r_{39a}$ of this small cross-sectional area portion 39a ($l_{39a} \geq 2r_{39a}$). The length $l_{39a}$ of the small cross-sectional area portion 39a is the length of only the pillar-like portion of this small cross-sectional area 39a excluding arcuate portions 43, 43 present on the opposite end portions thereof. In the other points, the construction of the previous invention is similar to the structure of the aforedescribed second example of the prior art. In the case of the structure of the previous invention, concave grooves 44 are formed in portions of the shaft 26 adjacent the small cross-sectional area 39a, and these concave grooves 44 are filled with synthetic resin 42 through through-holes 41, 41 formed in a cover tube 27. The portion around the small cross-sectional area portion 39a is not filled with synthetic resin.

When the energy absorbing type intermediate shaft of the previous invention (constructed as described above) is incorporated into the steering apparatus of an automobile whereby the movement of the steering wheel 2 (FIG. 8) can be transmitted to the steering gear the following action takes place during a collision. The energy absorbing type intermediate shaft 8b plastically deforms the small cross-sectional area portion 39a when an axial strong compressive force is applied thereto, whereby it is bent and absorbs energy based on the collision to thereby alleviate the shock applied to a driver's body. Thus, the operation is similar to that of the case of the structure of the aforedescribed second example of the prior art.

However, in the case of the energy absorbing type intermediate shaft 8b of the previous invention, the dimensions of the small cross-sectional area portion 39a are regulated as described above and therefore, even if backlash is present in the spline-engaged portion between the cover tube 27 and the shaft 26 and the shaft 26 is more or less displaced in the direction of rotation relative to the cover tube 27, the small cross-sectional area portion 39a will be sufficiently deformed in the direction of torsion thereof to thereby prevent any unnatural force from being applied to this small cross-sectional area portion 39a. That is, since the outer diameter $r_{39a}$ and length $l_{39a}$ of the small cross-sectional area portion 39a are regulated as described above, the torsion allowing angle of this small cross-sectional area portion 39a becomes great. As a result, even when this small cross-sectional area portion 39a is resiliently deformed on the basis of a rotational torque, the stress created in this small cross-sectional area portion 39a becomes small and even by a rotational torque applied repetitively thereto, it becomes difficult for any damage based on metal fatigue to be created in the small cross-sectional area portion 39a. Accordingly, it becomes unnecessary to strictly regulate the dimensional accuracy of the structural portion for blocking the rotation of the cover tube 27 and the shaft 26, i.e., the dimensional accuracy of the male spline grooves 29 and the female spline grooves 40. As a result, an increase in cost resulting from highly accurate working can be prevented and the cost of manufacture of the energy absorbing type intermediate shaft can be further reduced.

Now, the aforedescribed second and third examples of the intermediate shaft according to the prior art and the intermediate shaft according to the previous invention have the effect that they are easy to manufacture and a reduction in the cost of manufacture can be achieved. However, in the case of the structure of the aforedescribed previous invention and the structure of the second example of the prior art, one end surface of the shaft 26 bends in a state in which it strikes against the pin 34. Accordingly, the force required to bend the small cross-sectional area portion 39 (in the case of the structure of the second and third examples of the prior art shown in FIGS. 10 to 13) or 39a (in the case of the structure of the previous invention shown in FIG. 14) of the shaft 26 cannot always be made sufficiently small.

That is, in the aforedescribed prior-art structure (including the structure of the previous invention), in a state in which as shown in FIG. 13, the cover tube 27a is pushed by the receiving portion 46 and a portion of one end edge (the rear end edge or the right end edge as viewed in FIGS. 10 to 14) of the cover tube 27 (27a) bears against one end edge (the fore end edge or the left end edge as viewed in FIGS. 10 to 14) of the tube 25, one end surface (the rear end surface or the right end surface as viewed in FIGS. 10, 11 and 14) of the shaft 26 has already borne against the pin 34 as shown in FIG. 11. When from this state, the shaft 26 is further pushed rearwardly (rightwardly upwardly as viewed in FIG. 10), the center axes of the tubes 27 (27a) and 25 are bent on the basis of the engagement between the rear end edge of the cover tube 27 (27a) and the fore end edge of the tube 25, and the small cross-sectional area portion 39, 39a of the shaft 26 inserted in these tubes 27 (27a) and 25 is bent. At this time, actually, the second half (the right half as viewed in FIGS. 10, 11 and 14) of the shaft 26 tends to be pushed into the tube 25. However, since the rear end surface of the shaft 26 strikes against the pin 34, the retraction of the shaft 26 (an increase in the amount of entry into the tube 25) resulting from the bending of the small cross-sectional area portion 39, 39a does not take place smoothly and the force required for the bending of the small cross-sectional area portion 39, 39a becomes great. Further, at this time, a strong pressure force is applied from one end surface of the shaft 26 to the pin 34. Accordingly, it is necessary to secure the rigidity of this pin 34 sufficiently. As a result, the cost of manufacture of the pin 34 increases correspondingly. The energy absorbing type intermediate shaft of the present invention has been thought out in view of the circumstances as described above.

SUMMARY OF THE INVENTION

An energy absorbing type intermediate shaft of the present invention is provided with a tube, a shaft inserted in the tube from one end opening side of the tube against rotation relative to the tube, a displacement limiting portion provided between the shaft and the tube for enabling the axial displacement of the shaft and the tube only when a strong axial force is applied thereto, a small cross-sectional area portion formed in that portion of the intermediate portion of the shaft which is off the tube, a reinforcing member provided around the shaft for axial displacement only covering the circumference of the small cross-sectional area portion, and a pressing portion secured to the outer peripheral surface of the shaft and adapted to bear against the other end edge of the reinforcing member only when said strong force is applied, thereby pressing the reinforcing member. At least one of one end edge of the reinforcing member and one end edge of the tube which are opposed to each other is inclined in a direction in which one half side thereof is more spaced apart from the other end edge than the other half side. The pressing portion has its formed position regulated so that with the other end edge of the reinforcing member bearing against the pressing portion, one end edge of the reinforcing member may lie around the small cross-sectional area portion. The sum of the distance from the pressing portion to the other end edge of the reinforcing member before said strong force is applied and the gap distance between one end edge of the tube and one end edge of the reinforcing member which are opposed to each other is made smaller than the distance from one end surface of the shaft to a member provided on the other end portion of the tube and to which said one end surface is opposed.

In the case of the energy absorbing type intermediate shaft of the present invention constructed as described above, during the normal time (before a strong force is applied), the reinforcing member is present around the small cross-sectional area portion of the intermediate portion of the shaft. Therefore, it never happens that the shaft bends at this small cross-sectional area portion. When during a collision, an axial strong compressive force is applied, the shaft is first pushed into the tube against the limiting force of the displacement limiting portion. In this process, one end edge of the reinforcing member and one end edge of the tube bear against each other by their respective halves, and further one end edge of the tube pushes and moves the reinforcing member from around the small cross-sectional area portion. The pressing portion then bears against the other end edge of the reinforcing member, and the reinforcing member is pressed by this pressing portion. Thus, one end edge of the tube comes to lie around the small cross-sectional area portion. In the case of the present invention, however, it never happens that with one end edge of the tube lying around the small cross-sectional area portion, one end surface of the shaft strikes against the member provided on the other end portion of the tube and to which said one end surface is opposed.

When said compressive force is applied with one end edge of the tube lying around the small cross-sectional area portion, the shaft bends at the small cross-sectional area portion to thereby prevent an impact force applied from the fore end side of the energy absorbing type intermediate shaft from being transmitted to the rear end side of this intermediate shaft. When the shaft bends, one end surface of the shaft is not bearing against said member, and even if the amount of entry of the shaft into the tube resulting from the bending of the small cross-sectional area portion increases, said one end surface will not bear against said member. Accordingly, in the case of the energy absorbing type intermediate shaft of the present invention, the shaft is bent by a light force when the shock during a collision is applied thereto.

Further, a pressure force applied to the member provided on the other end portion of the tube and to which one end surface of the shaft is opposed, such as a pin for supporting the base end portion of a universal joint is practically decreased as compared with the case of the previous invention. Therefore, the rigidity of said member need not be made so great as that of the member provided on the other end portion of the tube in the structure of the second and third examples of the prior art or the structure of the previous invention. That is, by the reason that the distance between the point of application of the compressive force acting on this member and the fulcrum becomes shorter and the moment becomes smaller, the structure of the present invention becomes smaller in the stress. Accordingly, when the member provided on the other end portion of the tube is to be manufactured, the rigidity thereof can be made smaller. Thus, the cost of manufacture of this member can be reduced to thereby reduce the cost of manufacture of the entire energy absorbing type intermediate shaft.

DESCRIPTION OF THE PREFERRED EMBODIMENT

Figure 1:
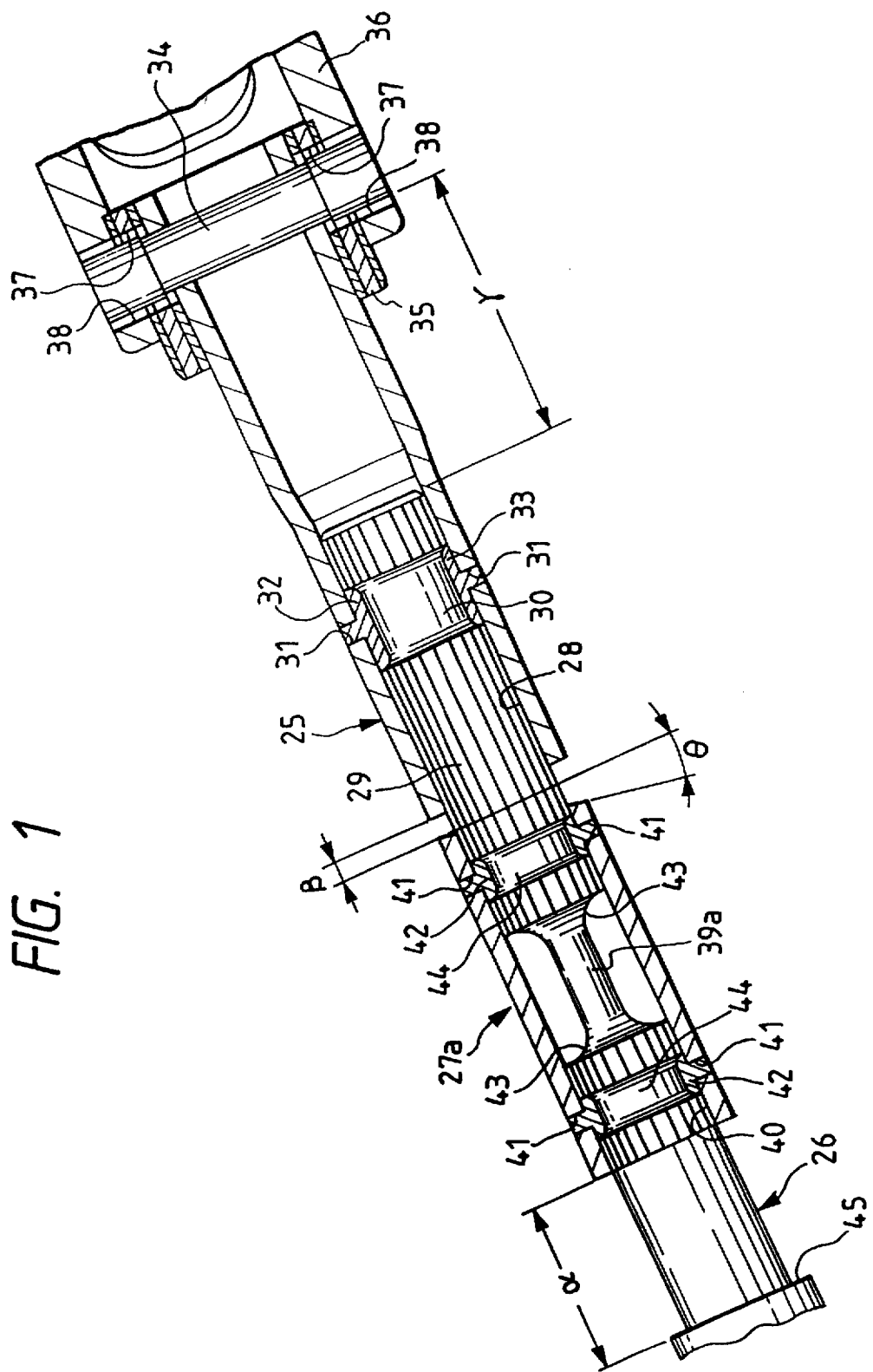
FIG. 1 is a cross-sectional view corresponding to the portion A of FIG. 8 but showing an embodiment of the present invention.

FIGS. 1 to 7 show an embodiment of the present invention. The energy absorbing type intermediate shaft of the present invention is characterized in that the dimensions of various constituent members are regulated so that when an axial strong compressive force is applied during a collision, a shaft 26 may be bent by a small force before one end portion (the right upper end portion as viewed in FIG. 1) of the shaft 26 bears against a member provided on an end portion (the right upper end portion as viewed in FIG. 1) of a tube 25. In the other points, the construction and action of the present embodiment are substantially similar to those of the energy absorbing type intermediate shaft of the aforedescribed second and third examples of the prior art or of the aforedescribed previous invention and therefore, the related portions as those in the second and third examples of the prior art or the previous invention are given the same reference numerals and overlapping descriptions will be omitted or simplified herein, and chiefly the characteristic portions of the present invention will hereinafter be described.

The energy absorbing type intermediate shaft of the present invention, like the energy absorbing type intermediate shaft of the aforedescribed second and third examples of the prior art or of the aforedescribed previous invention, is provided with the tube 25, the shaft 26 and a displacement limiting portion 33. A pin 34 is loosely inserted in circular holes 38 and 37 formed in a yoke 36 and a shock absorbing tube 35, respectively, constituting a first universal joint 7 on the other end portion of the tube 25. This pin 34 corresponds to a member provided on an end portion of the tube and to which one end surface of the shaft is opposed, and in the structure of the aforedescribed second and third examples of the prior art or of the previous invention, it forms the stopper portion. Also, that portion of the intermediate portion of the shaft 26 which is disposed apart from, in the axial direction, the tube 25 is provided with a small cross-sectional area portion 39a concentric with the shaft 26 and having a sufficiently small diameter as compared with the other portions of the shaft 26. A cover tube 27a which is a reinforcing member covers the circumference of the portion in which this small cross-sectional area portion 39a is formed. This cover tube 27a is supported around the shaft 26 for displacement only in the axial direction (the obliquely left to right direction as viewed in FIG. 1) thereof.

The small cross-sectional area portion 39a, as in the structure of the aforedescribed previous invention, is formed into a pillar-like shape concentric with the shaft 26, and the opposite ends of this small cross-sectional area portion 39a and the body portion of the shaft 26 are connected together by arcuate portions 43, 43. In the present embodiment, concave grooves 44, 44 are formed at two locations on the intermediate portion of the shaft 26 which sandwich the small cross-sectional area portion 39a therebetween. Through-holes 41, 41 are formed at two locations before and behind the cover tube 27a which are aligned with these concave grooves 44, 44. The through-holes 41, 41 and the concave grooves 44, 44 are filled with synthetic resin 42, 42, which are solidified.

A pressing portion 45 is formed on the outer peripheral surface of the fore end side (the left lower end side) of the shaft 26. This pressing portion 45 is formed by the rear end surface of a large-diametered portion formed on that portion of the fore end portion of the shaft 26 which is disposed apart from the cover tube 27a. When a strong compressive force resulting from a collision is applied to the shaft 26, this pressing portion 45 is adapted to bear against the other end edge (the fore end edge) of the cover tube 27a and press this other end edge. The location at which this pressing portion 45 is provided is regulated by the relation between the location at which the small cross-sectional area portion 39a is provided and the length of the cover tube 27a. That is, design is made such that with the pressing portion 45 bearing against the other end edge of the cover tube 27a, the end surface of this cover tube 27a lies around the small cross-sectional area portion 39a.

Figure 2:
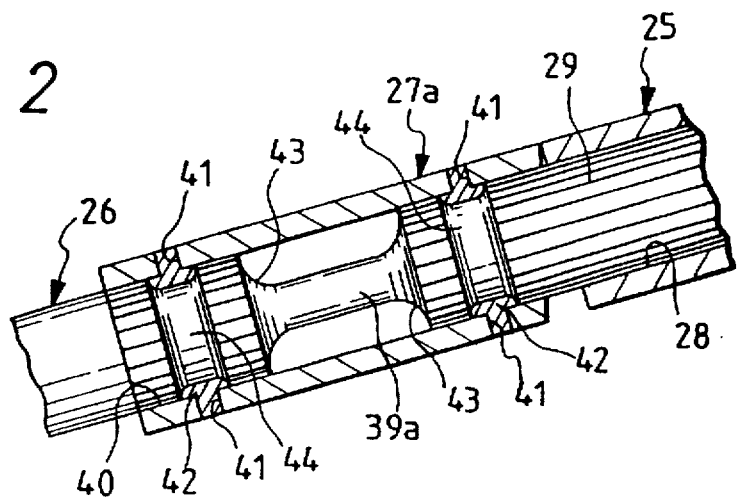
FIG. 2 is a cross-sectional view of principal portions of the FIG. 1 embodiment showing the state of the first stage in a collision.
Figure 3:
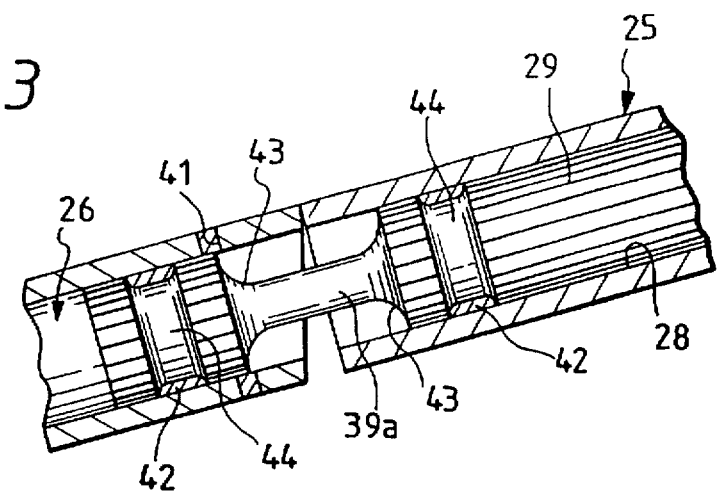
FIG. 3 is a cross-sectional view similar to FIG. 2 but showing the second stage in the collision.
Figure 5:
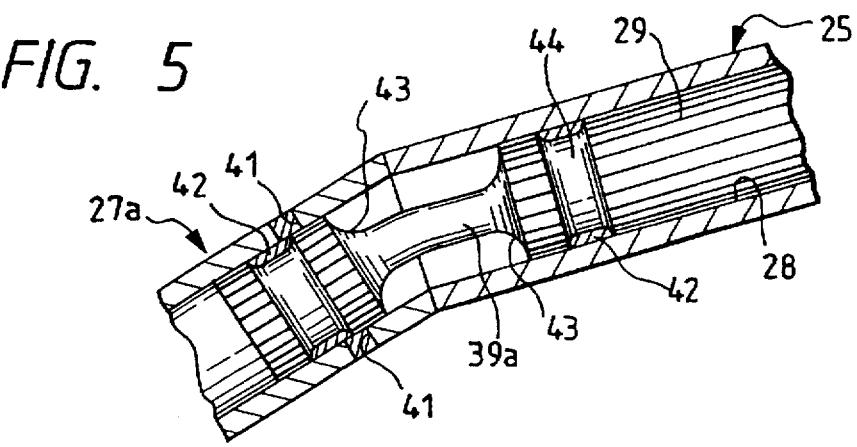
FIG. 5 is a cross-sectional view similar to FIG. 2 but showing the third stage in the collision.

Accordingly, when the compressive force is applied, a change in state occurs from a state as shown in FIG. 2 wherein the upper half of one end edge of the cover tube 27a strikes against the upper half of one end edge of the tube 25 via a state shown in FIG. 3 to a state as shown in FIG. 5 wherein one end edge of the cover tube 27a and one end edge of the tube 25 bear against each other over their entire circumferences. As the shaft 26 further moves toward the other end side of the tube 25, the pressing portion 45 bears against the other end edge of the cover tube 27a, whereupon the small cross-sectional area portion 39a becomes present inside one end edge of the tube 25.

Further, in the energy absorbing type intermediate shaft of the present invention, that portion of one end edge of the cover tube 27a which is opposed to one end edge (the left lower end edge as viewed in FIG. 1) of the tube 25 is inclined by an angle θ in a direction in which one half side thereof separates more from one end edge of the tube 25 than the other half side thereof. In the present embodiment, the value of this angle θ is 10 degrees (θ=10°). Instead of or with end edge of the cover tube 27a, one end edge of the tube 25 may be inclined.

Figure 4:
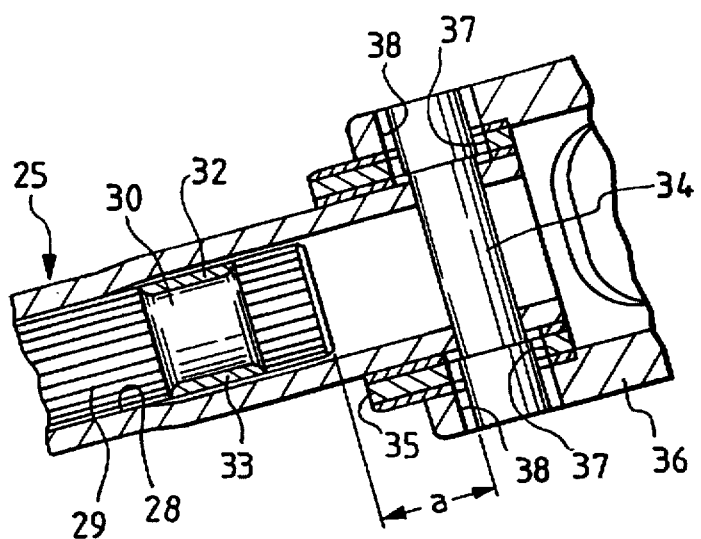
FIG. 4 is a cross-sectional view showing one end surface portion of a shaft at the second stage in the collision.
Figure 6:
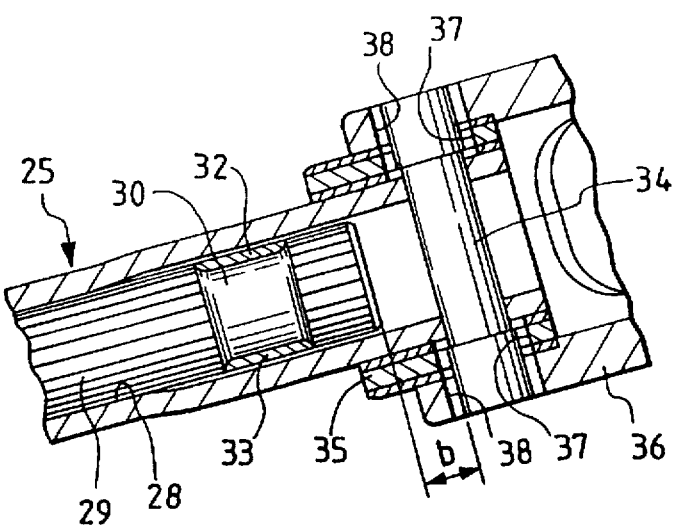
FIG. 6 is a cross-sectional view similar to FIG. 4 but showing one end surface portion of the shaft at the third stage in the collision.

The sum of the distance α from the pressing portion 45 to the other end edge (the left lower side end edge as viewed in FIG. 1) of the cover tube 27a and the gap distance β between one end edge of the tube 25 and closest one end edge of the cover tube 27a which are opposed to each other is made smaller than the distance γ from one end surface of the shaft 26 to the pin 34 supported on the other end portion of the tube 25 (α+β<γ). For example, α=28 mm, β=2.5 mm and γ=33.7 mm can be adopted as the values of these distances α, β and γ, respectively. However, the values of the distances α, β and γ will suffice if they satisfy α+β<γ, and are determined with the dimensions or the like of the tube 25 and other members taken into account. Further, in the state shown in FIG. 3, one end surface of the shaft 26 is spaced apart by a distance a from the pin 34 as shown in FIG. 4 (0<a<γ), and in the state shown in FIG. 5 wherein one end edge of the cover tube 27a and one end edge of the tube 25 bear against each other over their entire circumferences and the amount of entry of the shaft 26 into the tube 25 has increased from the state shown in FIGS. 3 and 4, the dimension of each constituent member is regulated so that said one end surface may be spaced apart by a distance b (0<b<a) from the pin 34 as shown in FIG. 6.

Figure 8:
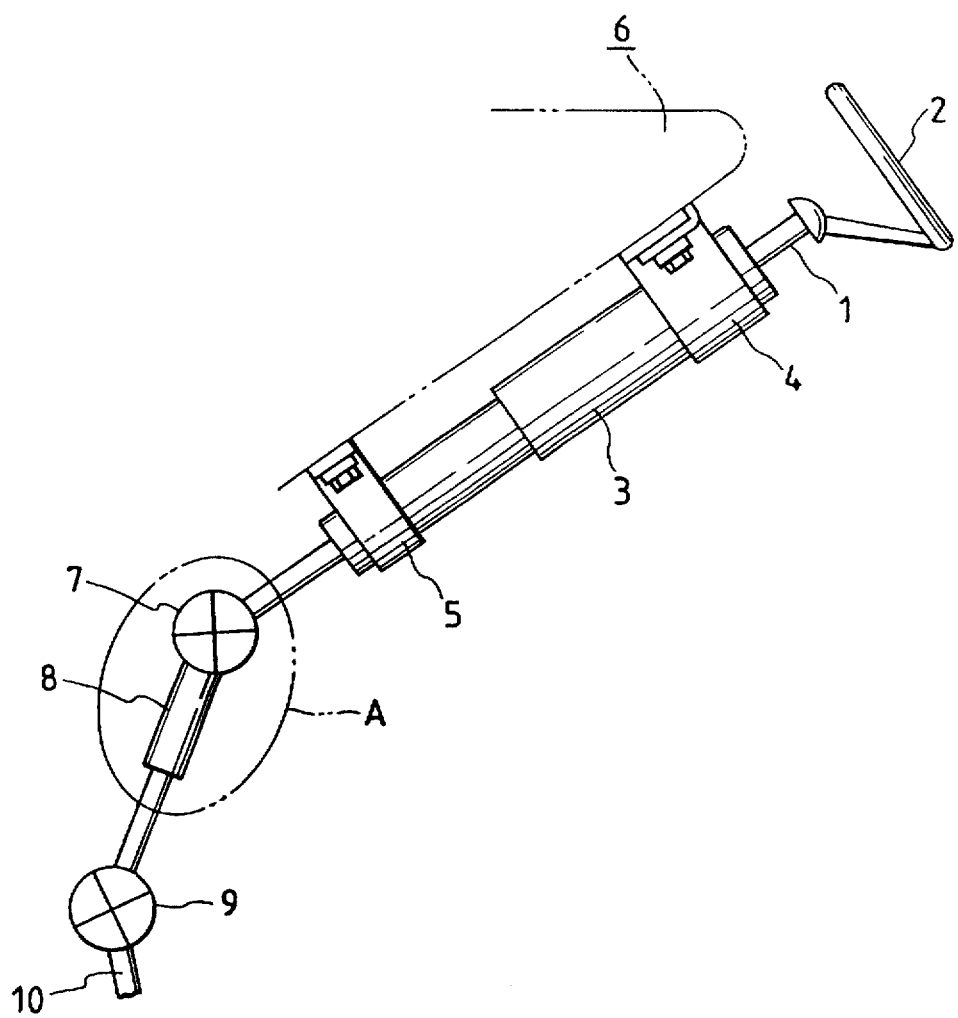
FIG. 8 is a side view showing an example of a prior art steering apparatus incorporating therein an energy absorbing type intermediate shaft.
Figure 9:
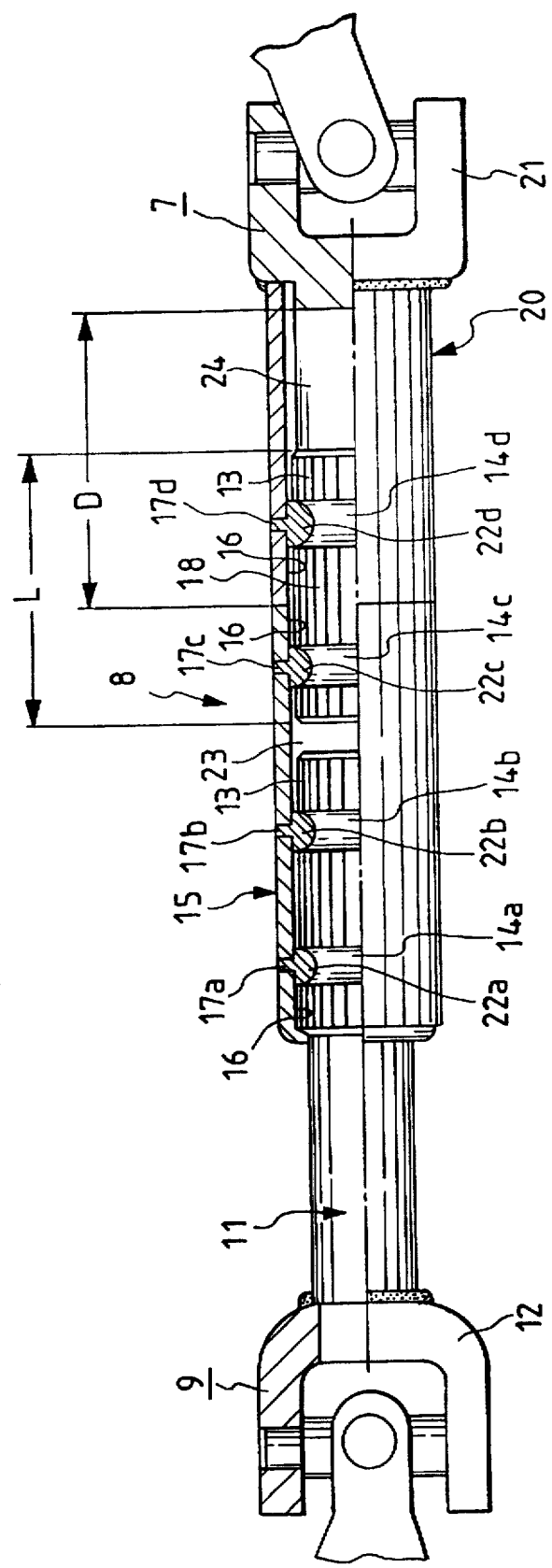
FIG. 9 is a half cross-sectional view showing the structure of a first example of the prior art.

The energy absorbing type intermediate shaft of the present invention constructed as described above is incorporated into the steering apparatus of an automobile and transmits the movement of the steering wheel 2 (FIG. 8) to the steering gear. During normal operation, the cover tube 27a is present around the small cross-sectional area portion 39a on the basis of the restraining force of the synthetic resin 42, 42. Therefore, shaft 26 does not bend at the small cross-sectional area portion 39a. A torque for steering is transmitted from the rear portion (the right portion as viewed in FIG. 1) to the fore portion (the left portion as viewed in FIG. 1) of the shaft 26 chiefly by the cover tube 27a.

When an axial strong compressive force is applied during a collision, the restraining force of the synthetic resin 42, 42 is lost. As in the case of the structure of the aforedescribed previous invention, the shaft 26 and the tube 25 are then axially displaced a change in state occurs from the state shown in FIG. 1 to a state as shown in FIG. 2 wherein the upper half of one end edge of the tube 25 and the upper half of one end edge of the cover tube 27a bear against each other. From this state, the shaft 26 is further moved rearwardly, whereby from the state shown in FIG. 2, the abutting surfaces of the tube 25 and the cover tube 27a are axially moved relative to the shaft 26 as shown in FIG. 3, and these abutting surfaces become present around the intermediate portion of the small cross-sectional area portion 39a. In the state shown in FIG. 3, one end surface of the shaft 26 is spaced apart by a distance a from the pin 34 as shown in FIG. 4. Also, in this state shown in FIG. 3, the pressing portion 45 bears against the other end edge of the cover tube 27a.

Figure 7:
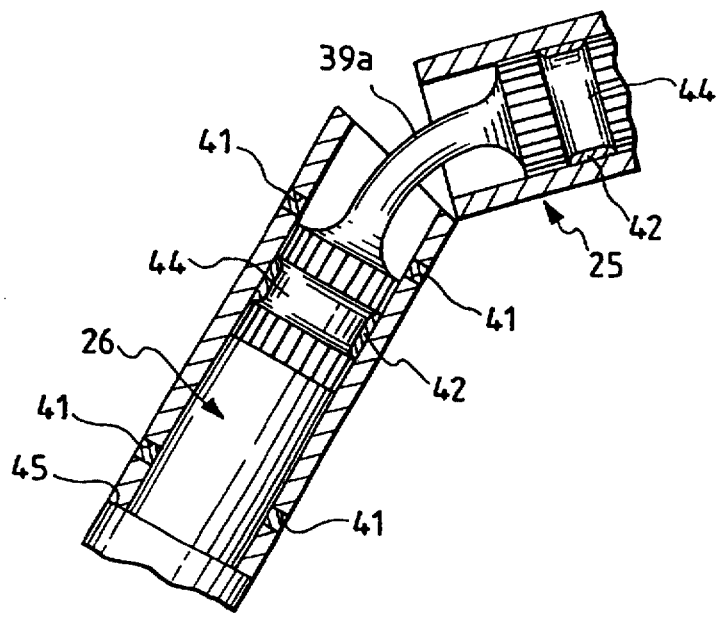
FIG. 7 is a cross-sectional view similar to FIG. 2 but showing the last stage in the collision.

When from such a state shown in FIG. 3, the above-mentioned compressive force is further applied, the cover tube 27a is pushed and the previously coaxial axes of this cover tube 27a and the tube 25 bend as shown in FIG. 5, and one end edge of the former and one end edge of the latter bear against each other over their entire circumferences. At this time, the shaft 26 tends to be pushed farthest into the tube 25, and the distance between one end surface of the shaft 26 and the pin 34 changes from distance a shown in FIG. 4 to distance b shown in FIG. 6. As described above, in the present invention, when the shock of a collision or the like is applied, the dimension of each constituent member is regulated so that even when one end surface of the shaft 26 approaches the pin 34 at its maximum, these may not bear against each other. After the state shown in FIGS. 5 and 6, the shaft 26 plastically deforms the small cross-sectional area portion 39a and thereby bends as shown in FIG. 7. By the small cross-sectional area portion 39a being thus plastically deformed, energy based on the collision is absorbed to thereby alleviate the shock applied to a driver's body. The action when the shock is thus alleviated is generally similar to that in the case of the structure of the previous invention.

Figure 10:
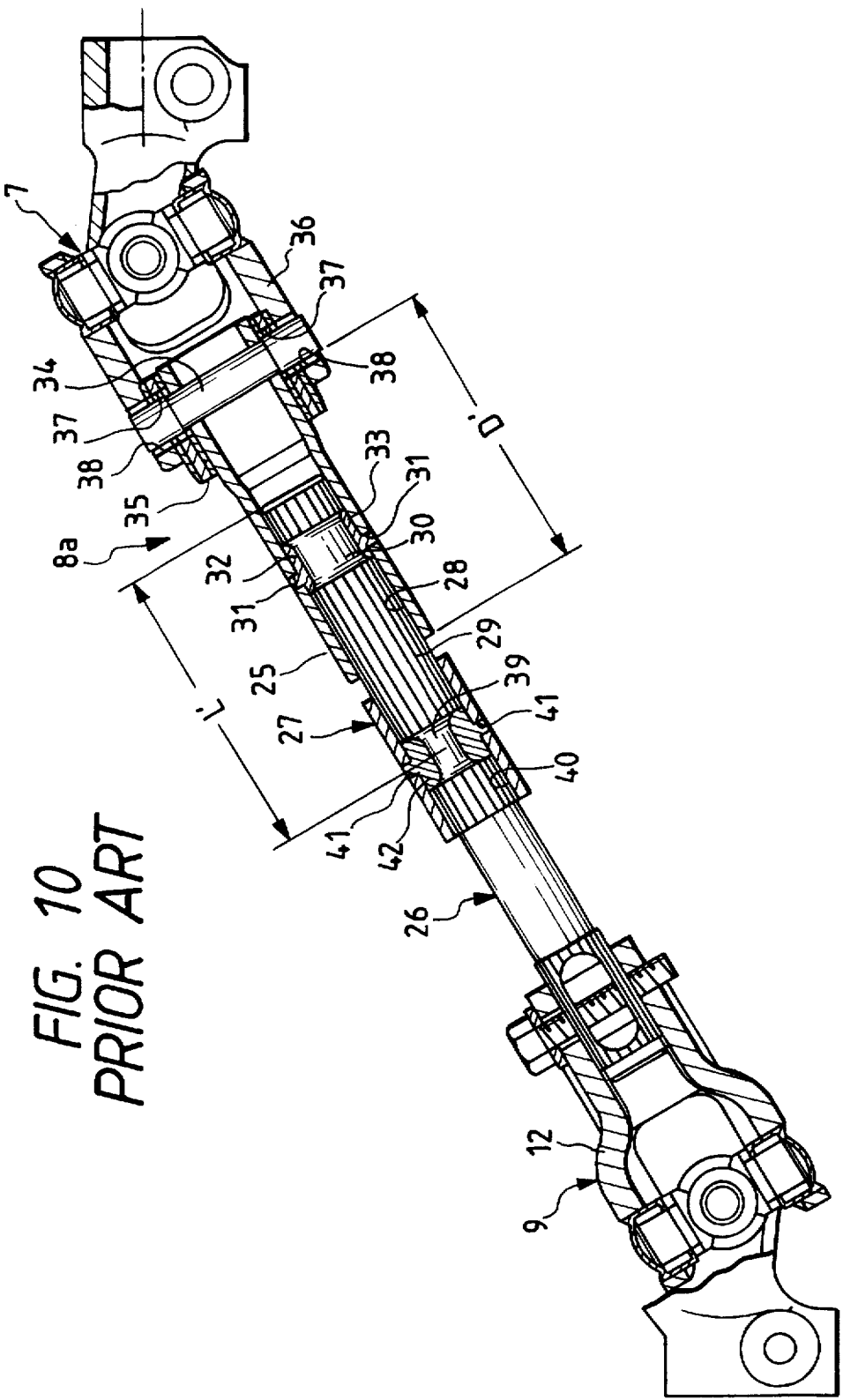
FIG. 10 is a cross-sectional view showing the structure of a second example of the prior art.
Figure 11:
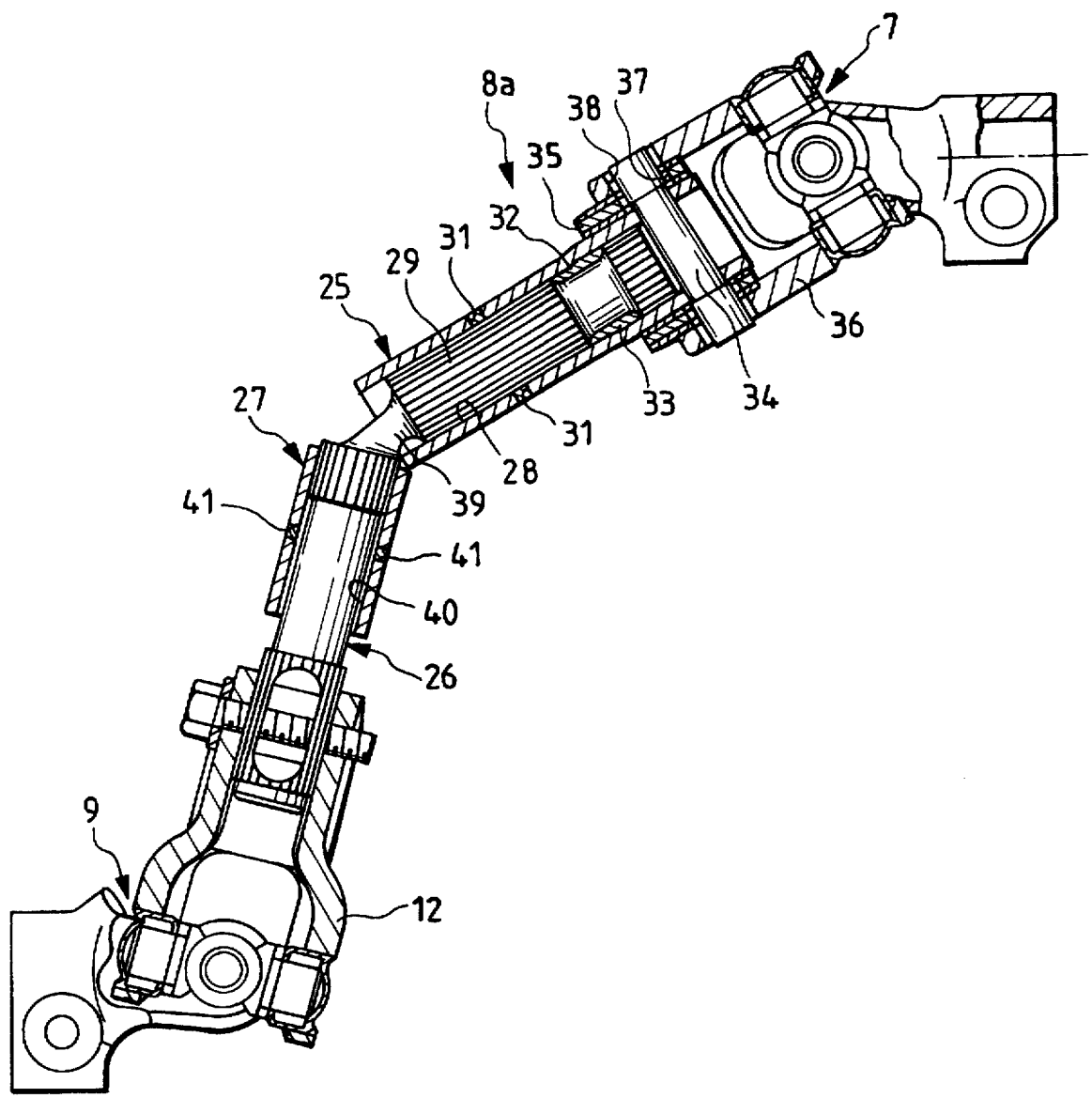
FIG. 11 is a cross-sectional view similar to FIG. 10 but showing the bent state of the shaft.
Figure 12:
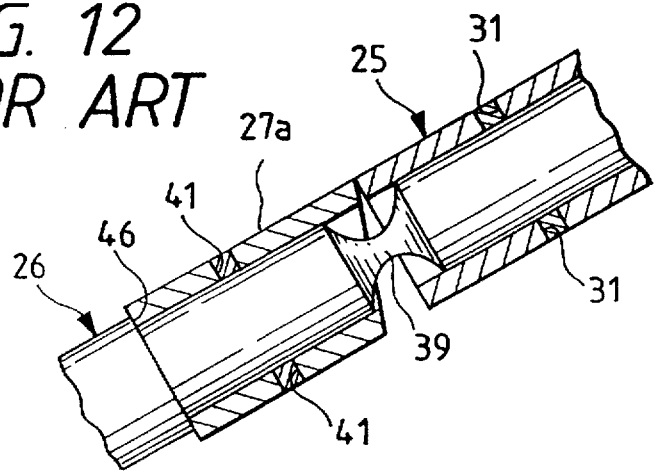
FIG. 12 is a cross-sectional view showing the essential portions of a third example of the structure of the prior art in a stage in a collision similar to the stage in FIG. 3.
Figure 13:
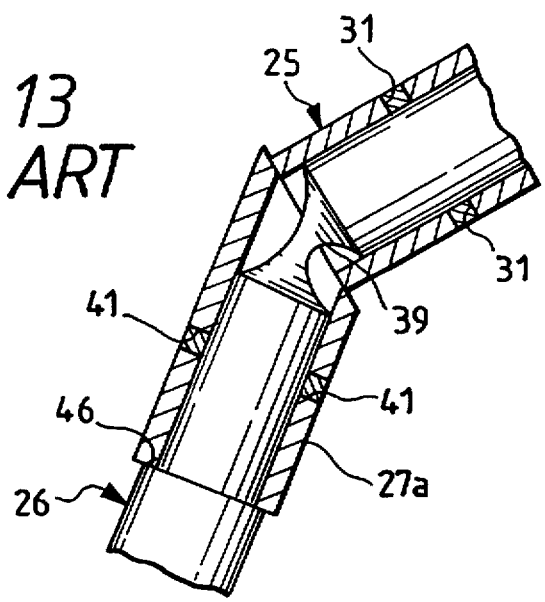
FIG. 13 is a cross-sectional view similar to FIG. 12 but showing the FIG. 12 structure at the last stage of a collision.
Figure 14:
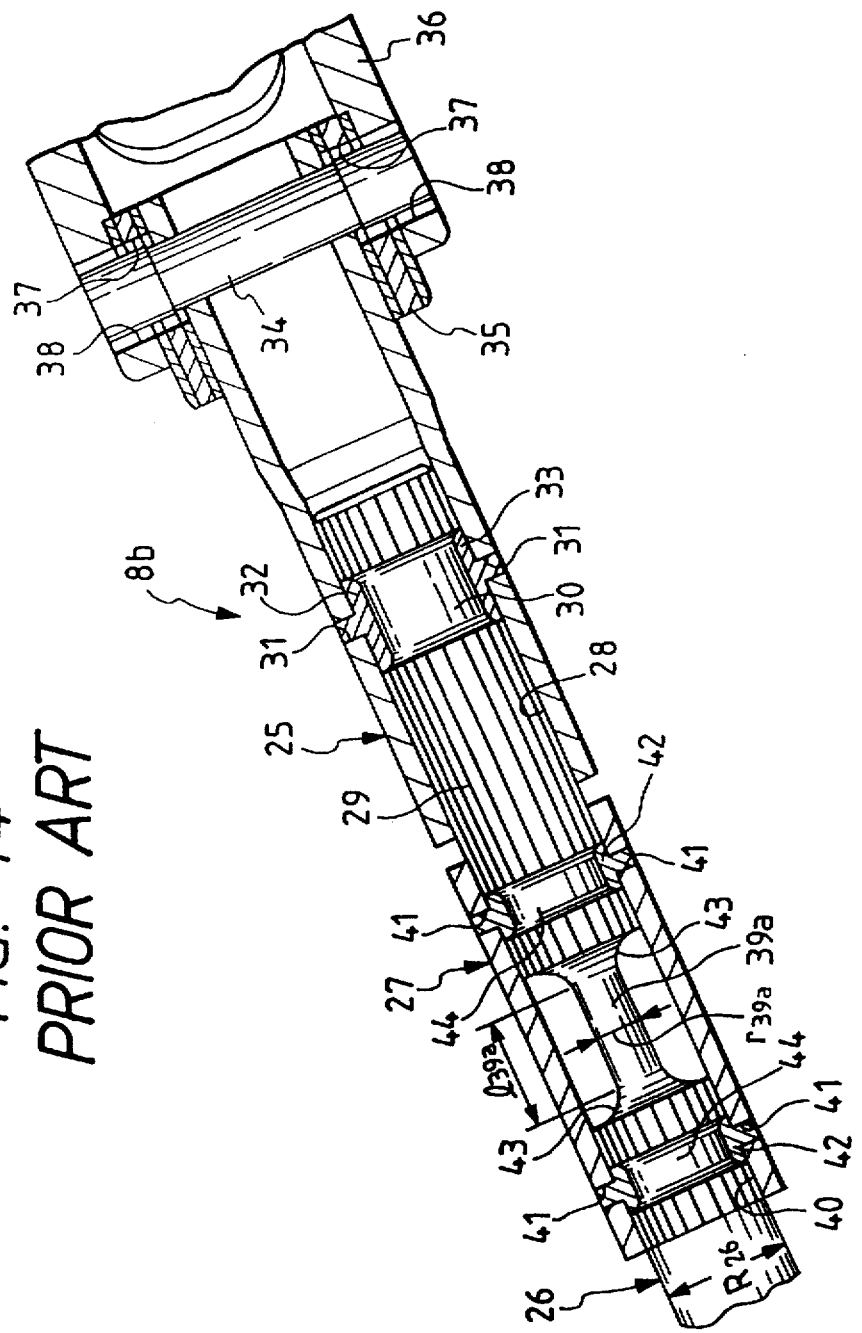
FIG. 14 is a cross-sectional view showing the structure of Applicant's previous invention prior art.

However, in the case of the energy absorbing type intermediate shaft of the present invention, the dimensions α, β and γ are regulated so as to be α+β<γ and therefore, when a strong compressive force is applied with a collision, the shaft 26 bends without one end surface thereof bearing against the pin 34. Accordingly, the shaft 26 is bent by a small force. That is, in the present invention, the dimension of each constituent member is regulated so that even when as shown in FIG. 6, one end surface of the shaft 26 approaches the pin 34 at its maximum, said one end surface and the pin 34 may not bear against each other. Accordingly, when the cover tube 27a, the tube 25 and the shaft 26 change from the state shown in FIGS. 3 and 4 to the state shown in FIGS. 5 and 6, the retraction of the shaft 26, i.e., an increase in the amount of entry of the shaft 26 into the tube 25, takes place smoothly. As a result, the force required for the bending of the small cross-sectional area portion 39a may be small. Also, since one end of the shaft 26 does not bear against the pin 34, a strong pressure force is not applied to this pin 34. Therefore, it is not necessary to make the rigidity of the pin 34 as great as that of the pin 34 of prior art FIGS. 10, 11 and 14. Thus, the manufacture of the pin 34 can be simplified. As a result, the ease of the manufacture and a reduction in the cost of manufacture of the entire energy absorbing type intermediate shaft can be achieved.

When the present invention is to be carried out, the dimensions of the small cross-sectional area portion 39a can also be regulated as in the previous invention to thereby prevent an increase in cost resulting from highly accurate working and achieve a reduction in the cost of manufacture of the energy absorbing type intermediate shaft. Further, in the illustrated embodiment, spline engagement is adopted as the rotation preventing structure for the tubes 25, 27a and shaft 26, but instead thereof, other known rotation preventing structure such as engagement between flat surfaces opposed to each other can also be adopted. Also, the structure for preventing the cover tube 27a from being displaced in the axial direction of the shaft 26 during normal operations need not always resort to the synthetic resin 42, but other structure can also be adopted such as pressing-in the fitting of an elastic ring or the like, or structure in which steel balls are pressed into a concave groove formed in one of the inner peripheral surface of the cover tube 27a and the outer peripheral surface of the shaft 26.

The energy absorbing type intermediate shaft of the present invention is constructed and acts as described above and therefore, can secure sufficient energy absorbing capability and yet can reduce the number of parts and simplify the assembling work to thereby achieve a reduction in the cost of manufacture. Further, the bending of the shaft can be accomplished by a small force and also, the rigidity of a member such as the pin provided on the other end portion of the tube need not be made particularly great with a compressive force applied during a collision being taken into account. Therefore, the securement of energy absorbing capability during a collision becomes more sufficient and the inexpensiveness and lighter weight of the member can be achieved. Thus, from this, a reduced cost of manufacture and lighter weight of the entire energy absorbing type intermediate shaft can be achieved.

What is claimed is:

1. For a steering apparatus of an automobile that transmits a steering force of a steering wheel to a steering gear, an energy absorbing intermediate shaft structure for absorbing a strong axial force applied thereto, comprising:

a tube portion having a first end and a second end;

a shaft inserted into said second end of said tube portion and being non-rotatable relative to said tube portion, said shaft having an end face opposing a member disposed on said tube portion toward said first end thereof, said shaft also having a small cross-sectional area portion formed in an intermediate portion of said shaft that is disposed away from said tube portion;

a displacement limiting portion provided between said shaft and said tube portion which enables relative axial displacement of said shaft and said tube portion only when said strong axial force is applied;

a reinforcing member surrounding said shaft so as to cover said small cross-sectional area portion; and a pressing portion disposed on said shaft and arranged to bear against a first end face of said reinforcing member only when said strong force is applied, thereby pressing said reinforcing member, wherein a second end face of said reinforcing member and an opposing end face of said tube portion are inclined relative to each other, said pressing portion is formed at a position such that, when said pressing portion bears against said first end face of said reinforcing member, said second end face of said reinforcing member is disposed around said small cross-sectional area portion, and a sum, prior to application of said strong axial force, of a distance from said pressing portion to said first end face of said reinforcing member and a closest distance from said second end face of said reinforcing member to said end face of said tube portion is made smaller than a distance from said end face of said shaft to said member disposed on said tube portion.

2. For a steering apparatus of an automobile that transmits a steering force of a steering wheel to a steering gear, an energy absorbing intermediate shaft structure for absorbing a strong axial force applied thereto, comprising:

a tube portion having a first end and a second end;

a shaft inserted into said second end of said tube portion and being non-rotatable relative to said tube portion, said shaft having an end face opposing a member disposed on said tube portion toward said first end thereof, said shaft also having a small cross-sectional area portion formed in an intermediate portion of said shaft that is disposed away from said tube portion;

a displacement limiting portion provided between said shaft and said tube portion which enables relative axial displacement of said shaft and said tube portion only when said strong axial force is applied;

a reinforcing member surrounding said shaft so as to cover said small cross-sectional area portion; and a pressing portion disposed on said shaft and arranged to bear against a first end face of said reinforcing member only when said strong force is applied, thereby pressing said reinforcing member, wherein one of a second end face of said reinforcing member and an opposing end face of said tube portion has diametrically opposite portions that are axially offset from each other, said pressing portion is formed at a position such that, when said pressing portion bears against said first end face of said reinforcing member, said second end face of said reinforcing member is disposed around said small cross-sectional area portion, and a sum, prior to application of said strong axial force, of a distance from said pressing portion to said first end face of said reinforcing member and a closest distance from said second end face of said reinforcing member to said end face of said tube portion is made smaller than a distance from said end face of said shaft to said member disposed on said tube portion.

* * * * *